United States Patent [19]

Hooijmans

[11] Patent Number: 4,814,717

[45] Date of Patent: Mar. 21, 1989

[54] FSK FREQUENCY DISCRIMINATOR FOR A COHERENT OPTICAL TRANSMISSION SYSTEM

[75] Inventor: Pieter W. Hooijmans, Eindhoven, Netherlands

[73] Assignee: U.S. Philips Corporation, New York, N.Y.

[21] Appl. No.: 123,473

[22] Filed: Nov. 20, 1987

[30] Foreign Application Priority Data

Nov. 28, 1986 [NL] Netherlands ..................... 8603034

[51] Int. Cl.$^4$ ............................................. H04L 27/14
[52] U.S. Cl. .................................... 329/103; 329/116; 329/204; 375/91
[58] Field of Search ............... 329/101, 103, 110, 112, 329/116, 204, 205 R; 375/80, 88, 91, 94

[56] References Cited

U.S. PATENT DOCUMENTS

| | | | |
|---|---|---|---|
| 3,223,929 | 12/1965 | Hofstad et al. | 375/80 X |
| 3,417,336 | 12/1968 | Cribbs et al. | 329/112 X |
| 4,694,260 | 9/1987 | Argintaru et al. | 329/116 X |

Primary Examiner—Siegfried H. Grimm
Attorney, Agent, or Firm—Robert J. Kraus

[57] ABSTRACT

A frequency discriminator for an optical coherent transmission system, wherein FSK signals having the frequencies F(1) and F(2) are processed. The discriminator comprises a first series arrangement of a differential stage, a filter and a full-wave rectifier for processing the signal having the frequency F(1) and a second series arrangement of a differential stage, a filter and a full-wave rectifier for processing the signal having the frequency F(2). The discriminator is extremely fit for use at frequencies >1 GHz and it is easy to integrate.

2 Claims, 1 Drawing Sheet

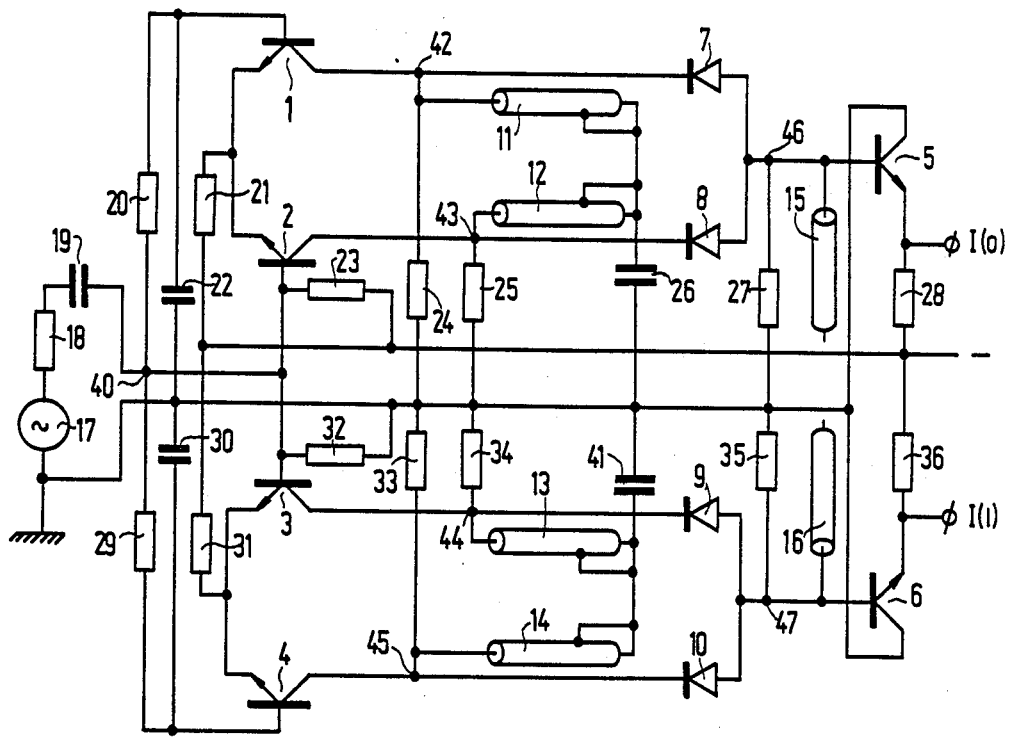

FSK FREQUENCY DISCRIMINATOR FOR A COHERENT OPTICAL TRANSMISSION SYSTEM

BACKGROUND OF THE INVENTION

The invention relates to a frequency discriminator for a coherent optical transmission system, comprising an input for supplying a FSK input signal having the frequencies F(1) and F(2). Coherent optical transmission systems are attractive as future systems with wide repeater spacing and large information capacity. The coherent optical transmission systems, wherein phase or frequency modulation and optical heterodyne or homodyne detection schemes are used offer the great advantage that the power of the receiver can be much smaller than is customary in the conventional PCM intensity-modulated systems.

Such a coherent optical transmission system is for example described in IEEE Journal of Quantum Electronics, Vol. QE.17, No. 6, June 1981, pp 935–940 and in IEEE Journal of Quantum Electronics, Vol. QE.19, No. 2, February 1983, pp 180–192. In the known coherent optical transmission systems using FSK, a detector commonly referred to as coincidence detector is used as a frequency discriminator, which detector is formed by means of a delay line and a double-balanced mixer, for example a bridge configuration of diodes. However, this known frequency discriminator has the disadvantage of not being stable and flexible anymore with frequencies exceeding 1 GHz. A further disadvantage is that with these high frequencies usually two separate discriminators are required, that is to say, one for automatic frequency control (AFC) and one for FSK detection. The known frequency discriminator further has the disadvantage because of its composition that it is hard to integrate in a semiconductor body.

The invention has for its object to provide measures for removing the aforesaid disadvantages and is characterized in that the input is connected to the two inputs of a first full-wave rectifier via a first differential stage, each one of the full-wave rectifier inputs being connected to a short-circuited transmission line having a length of approximately $\lambda(1)/4$, with $\lambda(1)$ representing the wavelength going with the frequency F(1), the short-circuited ends of the transmission lines being connected to a point of constant potential via a capacitor, the full-wave rectifier-output being connected to an open transmission line having a length of approximately $\lambda(1)/8$, and in that the input of the discriminator is connected to the two inputs of a second full-wave rectifier via a second differential stage, each one of the inputs of the second full-wave rectifier being connected to a short-circuited transmission line having a length of approximately $\lambda(2)/4$, with $\lambda(2)$ representing the wavelength going with the frequency F(2), the short-circuited ends of the transmission lines being connected to a point of constant potential via a capacitor, the output of the second full-wave rectifier being connected to an open transmission line having a length of approximately $\lambda(2)/8$.

BRIEF DESCRIPTION OF THE DRAWING

The single FIGURE of the drawings is a schematic diagram illustrating an embodiment of the FSK frequency discriminator of the invention.

The invention will now further be described with reference to the FIGURE.

DESCRIPTION OF THE PREFERRED EMBODIMENT

The emitter-coupled transistors 1 and 2 together form the first differential stage. The collector of transistor 1 is connected to the input 42 of the full-wave rectifier formed by the two diodes 7 and 8. The collector of the transistor 2 is connected to the input 43 of the full-wave rectifier. The respective inputs 42 and 43 of the full-wave rectifier are connected to capacitor 26 via the short-circuited transmission lines 11 and 12, the remaining connecting point of the capacitor being connected to earth. The anodes of the diodes 7 and 8 are interconnected. The junction point 46 forms the output of the full-wave rectifier and is connected to the base of the transistor 5 connected as an emitter follower. The base of transistor 5 is connected to the open transmission line 15 and is connected to earth via a resistor 27. The emitter of the transistor 5 is connected to a point of negative potential via the resistor 28. The detected signal going with the frequency F(1) can be taken off at point I(0). The collector of the transistor 1 is connected to earth via the resistor 24 and the collector of transistor 2 is connected to earth via the resistor 25. The base of transistor 2 is directly connected to the input 40 of the discriminator and the base of transistor 1 is connected to the input 40 of the discriminator via resistor 20, the FSK input signal being applied to the discriminator via the source 17, the resistor 18 and the capacitor 19. The base of the transistor 1 is connected to earth via capacitor 22. The emitters of transistors 1 and 2 are connected to a point of negative potential via resistor 21, this point being connected to the base of transistor 2 via resistor 23.

The emitter-coupled transistors 3 and 4 together form the second differential stage. The collector of transistor 3 is connected to the input 44 of the full-wave rectifier formed by the diodes 9 and 10. The collector 4 is connected to input 45 of the full-wave rectifier. The respective inputs 44 and 45 of the full-wave rectifier are connected to the capacitor 41 via the short-circuited transmission lines 13 and 14, the remaining connecting point of the capacitor being connected to earth. The anodes of the diodes 9 and 10 are interlinked. The junction point 47 forms the output of the full-wave rectifier and is connected to the base of the transistor 6 connected as an emitter follower. The base of the transistor 6 is connected to the open transmission line 16 and is connected to earth via resistor 35. The emitter of the transistor 6 is connected to a point of negative potential via resistor 36. The detected signal going with the frequency F(2) can be received from point I(1). The collector of the transistor 4 is connected to earth via resistor 33 and the collector of transistor 3 is connected to earth via resistor 34. The base of the transistor 3 is directly connected to the input 40 of the discriminator and the base of transistor 4 is connected thereto via resistor 29. The base of the transistor 4 is connected to earth via capacitor 30. The emitters of the transistors 3 and 4 are connected to a point of negative potential via resistor 31. The base of transistor 3 is connected to earth via resistor 32.

The signal source 17 delivers a FSK signal, composed of a series of signals having a frequency F(1) and signals having a frequency F(2). For example, the frequency F(1) is equal to 750 MHz and represents a logic 0. For example, the frequency F(2) is equal to 1500 MHz and represents a logic 1. The asymmetrical FSK input signal is converted into two symmetrical FSK signals by means of the first differential stage (1, 2) and the second differential stage (3, 4). With the aid of the short-circuited transmission lines 11 and 12 working as a band filter and having a length of approximately $\lambda(1)/4$, wherein $\lambda(1)$ represents the wavelength going with the frequency F(1), the signals of frequency F(1) are filtered out of the symmetrical FSK signal. These filtered signals are subsequently rectified in the full-wave rectifier formed by the diodes 7 and 8. The rectified signal is subsequently supplied to the base of the transistor 5 connected as an emitter follower and acting as a buffer stage between the output 46 of the full-wave rectifier and the output I(0), from which the logic output signal is received. By means of the transmission line 15, having a length of approximately $\lambda(1)/8$ the double frequency 2F(1), always appearing in full-wave rectifying, is filtered out.

By means of the short-circuited transmission lines 13 and 14 working as a band filter the signals having the frequency F(2) are filtered out of the symmetrical FSK signal. Subsequently, these filtered signals are rectified in the full-wave rectifier formed by the diodes 9 and 10. The rectified signal is then supplied to the base of the transistor 6 connected as an emitter follower and acting as a buffer stage between the output 47 of the full-wave rectifier and the output I(1) from which the logic output signal is received. The double frequency 2F(2), always appearing in full-wave rectifying, is filtered out by means of the transmission line 16.

The balanced configuration of the FSK discriminator in accordance with the invention offers the advantage that the spurious capacitances which occur can be compensated for in a simple manner by accordingly changing the lengths of the transmission lines 11, 12, 13 and 14. To compensate for the aforementioned spurious capacitances in a discriminator already realized the length of the transmission lines 11 and 12 was made equal to $0.75\lambda(1)/4$ and of transmission lines 13 and 14 equal to $0.6\lambda(2)/4$.

A further advantageous feature is the fact that owing to the full-wave rectifying the second harmonic of the modulation frequency arises which is situated farther in the frequency domain than the modulation frequency and, consequently, can be filtered out in a fairly simple manner.

Customary values for the resistors and capacitors are, for example,:
Resistors: 20,21,24,25,29,31—100 Ω
Resistors: 33,34—300 Ω
Resistors: 27,35—150 Ω
Resistors: 28,36—250 Ω
Resistor: 23—1500 Ω
Resistor: 32—3000 Ω
Capacitors 19,22,30,26,41 10 nanofarads

What is claimed is:

1. A frequency discriminator for a coherent optical transmission system, comprising an input for supplying a FSK input signal having the frequencies F(1) and F(2), characterized in that the input is connected to the two inputs of a first full-wave rectifier via a first differential stage, each one of the full-wave rectifier inputs being connected to a short-circuited transmission line having a length of approximately $\lambda(1)/4$, with $\lambda(1)$ representing the wavelength going with a frequency F(1), the short-circuited ends of the transmission lines being connected to a point of constant potential via a capacitor, the full-wave rectifier-output being connected to an open transmission line having a length of approximately $\lambda(1)/8$ and in that the input of the discriminator is connected to the two inputs of a second full-wave rectifier via a second differential stage, each one of the inputs of the second full-wave rectifier being connected to a short-circuited transmission line having a length of approximately $\lambda(2)/4$, with $\lambda(2)$ representing the wavelength going with the frequency F(2), the short-circuited ends of the transmission lines being connected to a point of constant potential via a capacitor, the output of the second full-wave rectifier being connected to an open transmission line having a length of approximately $\lambda(2)/8$.

2. A frequency discriminator as claimed in claim 1, characterized in that the first and the second differential stage each comprises two emitter-coupled transistors, the collectors of the two emitter-coupled transistors in the first and the second differential stage each being connected to the open transmission line of the respective differential stage via a diode, and in that of the emitter-coupled transistors in the first and second differential stage one base is connected directly to the input of the discriminator and one base is connected to the input of the discriminator via a resistor.

* * * * *